(12) United States Patent
Hall

(10) Patent No.: US 10,554,761 B2
(45) Date of Patent: Feb. 4, 2020

(54) METHODS AND APPARATUS TO IMPROVE TRANSMISSION OF A FIELD DATA SET TO A NETWORK ACCESS POINT VIA PARALLEL COMMUNICATION SESSIONS

(71) Applicant: AT&T Intellectual Property I, L.P., Atlanta, GA (US)

(72) Inventor: Robert J. Hall, Berkeley Heights, NJ (US)

(73) Assignee: AT&T INTELLECTUAL PROPERTY I, LP, Atlanta, GA (US)

( * ) Notice: Subject to any disclaimer, the term of this patent is extended or adjusted under 35 U.S.C. 154(b) by 380 days.

(21) Appl. No.: 14/967,281

(22) Filed: Dec. 12, 2015

(65) Prior Publication Data

US 2017/0171319 A1      Jun. 15, 2017

(51) Int. Cl.
*H04L 29/08*      (2006.01)
*H04L 29/06*      (2006.01)
*H04W 76/15*     (2018.01)

(52) U.S. Cl.
CPC ........ *H04L 67/141* (2013.01); *H04L 65/4007* (2013.01); *H04L 67/06* (2013.01);
(Continued)

(58) Field of Classification Search
CPC . H04L 65/4007; H04L 65/4023; H04L 67/06; H04L 67/1078; H04L 67/108;
(Continued)

(56) References Cited

U.S. PATENT DOCUMENTS 6,021,124 A * 2/2000 Haartsen ................. H04L 25/14
                                                                        370/336

6,052,385 A * 4/2000 Kanerva ............. H04W 76/025
                                                                        370/310

(Continued)

FOREIGN PATENT DOCUMENTS

JP           2014053920         3/2014
KR          101457561          11/2014
(Continued)

OTHER PUBLICATIONS

Zeitoun et al., "Scalable Parallel-Access for Mirrored Servers", The 20th IASTED International Conference on Applied Informatics, Feb. 2002.*

(Continued)

*Primary Examiner* — Atta Khan
*Assistant Examiner* — William C McBeth
(74) *Attorney, Agent, or Firm* — Haynes and Boone, LLP

(57) ABSTRACT

Methods, apparatus, systems and articles of manufacture to transfer a data set via parallel communications are disclosed herein. Example methods include controlling the distribution of portions of a field data set to a network access point via a plurality of parallel communication sessions established by respective ones of a plurality of communication devices with the network access point. Example methods also include comparing a first value based on a respective data transfer rate of a first one of the communication sessions to a second value based on a respective data transfer rate of a second one of the communication sessions to determine whether to establish a new communication session with a third one of the plurality of communication devices. In response to determining to establish a new communication session, a processor instructs a third one of the communication devices to establish the new communication session to transmit a respective portion of the field data set to the network access point.

20 Claims, 9 Drawing Sheets

(52) U.S. Cl.
CPC ........ *H04L 67/108* (2013.01); *H04L 67/1085* (2013.01); *H04L 67/14* (2013.01); *H04W 76/15* (2018.02)

(58) Field of Classification Search
CPC ... H04L 67/1085; H04L 67/14; H04L 67/141; H04L 67/143; H04L 69/14; H04L 25/14; H04W 76/025; H04W 76/15
See application file for complete search history.

(56) References Cited

U.S. PATENT DOCUMENTS

| | | | |
|---|---|---|---|
| 6,105,029 A * | 8/2000 | Maddalozzo, Jr. | H04L 67/06 |
| 6,240,140 B1 * | 5/2001 | Lindbergh | H04L 25/14 370/329 |
| 7,716,312 B2 * | 5/2010 | Gamble | H04L 67/06 709/203 |
| 7,765,307 B1 * | 7/2010 | Kritov | H04L 69/14 709/227 |
| 8,150,914 B1 * | 4/2012 | Taneja | H04L 67/06 709/203 |
| 8,239,515 B2 | 8/2012 | Chapweske | |
| 8,683,112 B2 | 3/2014 | Drobychev et al. | |
| 8,966,112 B1 * | 2/2015 | Franke | H04L 69/14 370/229 |
| 9,009,260 B2 | 4/2015 | Ewanchuk et al. | |
| 9,063,904 B2 | 6/2015 | Ferris | |
| 9,116,909 B2 | 8/2015 | Sorenson, III | |
| 2002/0188728 A1 * | 12/2002 | Ballard | H04L 67/06 709/227 |
| 2004/0217980 A1 | 11/2004 | Radburn et al. | |
| 2005/0044250 A1 * | 2/2005 | Gay | H04L 67/06 709/230 |
| 2005/0111361 A1 * | 5/2005 | Hosein | H04J 3/12 370/230 |
| 2005/0186933 A1 | 8/2005 | Trans | |
| 2006/0089996 A1 * | 4/2006 | Peiffer | H04L 67/14 709/227 |
| 2006/0224763 A1 * | 10/2006 | Altunbasak | H04L 69/14 709/231 |
| 2007/0288604 A1 * | 12/2007 | Achtermann | H04L 67/06 709/220 |
| 2008/0002593 A1 * | 1/2008 | Achtermann | H04L 47/32 370/252 |
| 2009/0054001 A1 * | 2/2009 | Westerberg | H04L 43/0858 455/67.11 |
| 2011/0022684 A1 * | 1/2011 | Nakao | H04L 67/06 709/219 |
| 2011/0274115 A1 * | 11/2011 | Lin | H04L 67/2819 370/401 |
| 2012/0047284 A1 | 2/2012 | Tarkoma | |
| 2012/0221684 A1 | 8/2012 | Ferris | |
| 2012/0259988 A1 * | 10/2012 | Erringer | H04L 67/148 709/228 |
| 2012/0331111 A1 * | 12/2012 | Wu | H04W 76/025 709/219 |
| 2013/0311614 A1 * | 11/2013 | Salkintzis | H04W 76/025 709/219 |
| 2014/0047059 A1 * | 2/2014 | Brownlow | H04L 67/1074 709/213 |
| 2014/0082213 A1 * | 3/2014 | Jung | H04L 67/06 709/235 |
| 2014/0143301 A1 * | 5/2014 | Watson | H04L 69/14 709/203 |
| 2014/0164516 A1 | 6/2014 | Maltbie et al. | |
| 2014/0258365 A1 * | 9/2014 | L'Heureux | H04L 69/16 709/203 |
| 2015/0063374 A1 | 3/2015 | Venkatachalam Jayaraman et al. | |
| 2015/0207743 A1 * | 7/2015 | Zanger | H04L 69/14 709/233 |
| 2015/0271232 A1 * | 9/2015 | Luby | H04L 65/4084 709/231 |
| 2016/0007223 A1 * | 1/2016 | Sun | H04W 76/15 709/219 |
| 2016/0094608 A1 * | 3/2016 | Sundararajan | H04L 69/14 709/219 |
| 2016/0295480 A1 * | 10/2016 | Wakayama | H04L 69/14 |
| 2016/0337428 A1 * | 11/2016 | May, Jr. | H04L 69/14 |
| 2017/0048328 A1 * | 2/2017 | Korotaev | H04L 67/141 |
| 2017/0295218 A1 * | 10/2017 | Shanmugam | H04L 67/06 |
| 2018/0302503 A1 * | 10/2018 | Trossell | H04L 69/24 |

FOREIGN PATENT DOCUMENTS

| | | |
|---|---|---|
| KR | 20140140774 | 12/2014 |
| WO | 03/040653 | 5/2003 |
| WO | 2014147362 | 9/2014 |
| WO | 2015051844 | 4/2015 |

OTHER PUBLICATIONS

Zhu et al., "Using Cooperative Multiple Paths to Reduce File Download Latency in Cellular Data Networks", IEEE Global Telecommunications Conference, 2005, Dec. 2005, pp. 2480-2484.*

Arsan, Taner, et al., "Implementation of Application for Huge Data File Transfer", International Journal of Wireless & Mobile Networks (IJWMN), vol. 6, No. 4, Aug. 2014 (20 pages).

Shyam Nandan Kumar, "Advanced Mechanism to Handle Big Data of HD Video File for Mobile Devices", International Journal of Research in Engineering Technology and Management, vol. 2, Issue 6, Nov. 2014 (7 pages).

Mundhada, Radha A., et al., "An Approach for Sharing Secured and Efficient Video Streaming over the Cloud", International Journal on Recent and Innovation Trends in Computing and Communication, vol. 3, Issue 5, May 2015 (4 pages).

Ngo, Dong, "WD My Passport Wireless review: A versatile mobile drive for photographers", CNET, Reviewed on Sep. 3, 2014 (4 pages).

Rodriguez, Marcos Balsa, et al., "Compression-domain Seamless Multiresolution Vizualization of Gigantic Triangle Meshes on Mobile Devices", Proceedings of the 18th International Conference on 3D Web Technology, 2013 (9 pages).

Synchronoss, "Synchronoss Mobile Content Transfer", Wayback Machine, <web.archive.org>, Dec. 5, 2014 (5 pages).

* cited by examiner

METHODS AND APPARATUS TO IMPROVE TRANSMISSION OF A FIELD DATA SET TO A NETWORK ACCESS POINT VIA PARALLEL COMMUNICATION SESSIONS

FIELD OF THE DISCLOSURE

This disclosure relates generally to the transmission of field data sets and, more particularly, to methods and apparatus to improve the transmission of a field data set to a network access point via parallel communication sessions.

BACKGROUND

The numbers of available methods and apparatus used to collect field data is rapidly increasing thereby resulting in the creation of very large data sets. The shelf-life of the information contained in such large data sets is often quite short, lasting only days or even hours. As such, the rapid transmission of the information to a data center for analysis is often critical to reaping the benefits of the collection of these very large data sets.

BRIEF DESCRIPTION OF THE DRAWINGS

Wherever possible, the same reference numbers will be used throughout the drawing(s) and accompanying written description to refer to the same or like parts.

DETAILED DESCRIPTION

Figure 1:
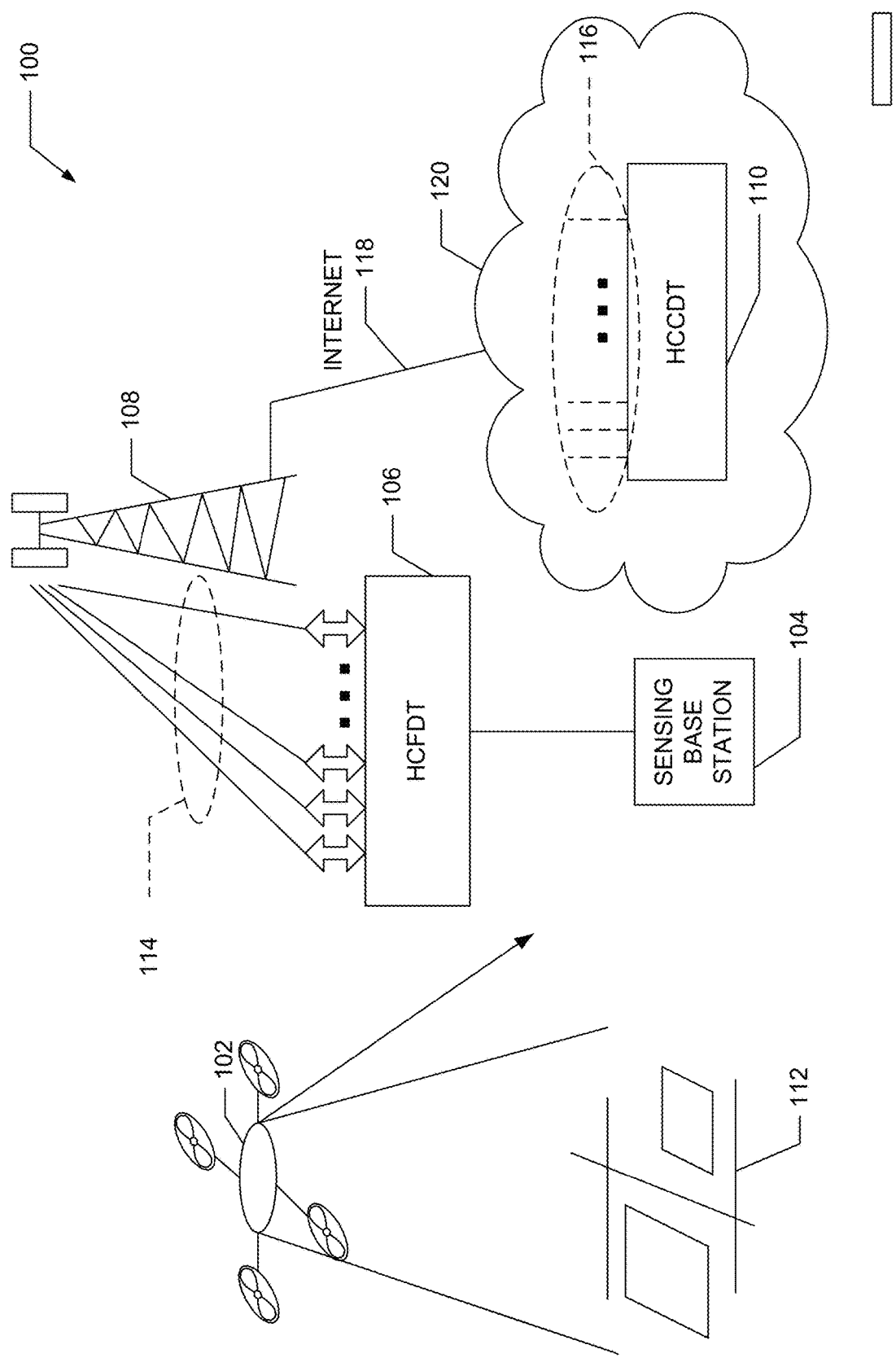
FIG. 1 is a block diagram of an example data collection and transmission system including an example high capacity field data transceiver and an example high capacity cloud data transceiver.

The methods, apparatus and systems disclosed herein provide ways to improve the transmission of large data sets via parallel communication sessions. Some example methods to transfer a data set in parallel disclosed herein include controlling the distribution of a field data set to a network access point in parallel via a plurality of communication sessions established by respective ones of a plurality of communication devices with the network access point and comparing a first value based on a respective data transfer rate of a first one of the communication sessions to a second value based on a respective data transfer rate of a second one of the communication sessions to determine whether to establish a new communication session with a third one of the plurality of communication devices. Some example methods further include, in response to determining to establish a new communication session, instructing, with a processor, a third one of the communication devices to establish the new communication session to transmit a respective portion of the field data set to the network access point.

In some examples disclosed herein comparing the first value to the second value includes determining whether the respective second value is higher than the first value by a threshold amount. In some examples, the second value is a total data transfer rate of multiple ones of the plurality of communication sessions including the respective data transfer rates of the first one and the second one of the plurality of communication sessions. In some examples, the value is equal to the respective data transfer rate of the second one of the communication sessions. Some example methods further include comparing the first value to the second value to determine whether to terminate the second one of the plurality of communication sessions, and in response to determining to terminate the second one of the plurality of communication sessions, instructing the second one of the plurality of communication devices to terminate the second one of the plurality of communication sessions. Some such example methods also include instructing the second one of the plurality of communication devices to re-establish a new communication session with the network access point to transmit the respective portion of the field data set to the network access point.

In some example methods, the portions of the field data set are chunks of the data set, and the method additionally includes using a data chunking technique to obtain a set of chunks and distributing the chunks to the respective ones of the plurality of communication devices. In still further examples, distributing the chunks to the respective ones of the plurality of communication devices includes monitoring respective input queues of the respective communication devices to determine when the respective input queues are empty, and distributing respective chunks to ones of the respective input queues when the ones of the respective input queues are empty. Additional example methods also include initiating a first set of communication sessions, and initiating a second set of communication sessions. In response to determining that a first overall data transfer rate achieved using the first and second sets of communication sessions is not greater, by a threshold value, than a second overall data transfer rate achieved using the first set of communication sessions but not the second set of communication sessions, some methods terminate the second set of communication sessions.

In some examples disclosed herein include a tangible computer readable storage medium comprising computer readable instructions which, when executed, cause a computer to perform operations. Such operations include transmitting portions of a field data set to a network access point in parallel via a plurality of communication sessions established by respective ones of a plurality of communication devices with the network access point and comparing a respective data transfer rate of a first one of the communication sessions associated with a first one of the communication devices to a value based on a respective data transfer rate of a second one of the communication sessions to determine whether to terminate the first one of the communication sessions. Further operations include, in response to determining to terminate the first one of the communication sessions, instructing the first one of the communication devices to terminate the first one of the communication sessions and to re-establish a new communication session with the network access point to transmit a respective portion of the field data set to the network access point.

In some examples, comparing the respective data transfer rate of the first one of the communication sessions associated with the first one of the communication devices to the value based on the respective data transfer rate of the second one of the communication sessions to determine whether to terminate the first one of the communication sessions includes determining whether the respective data transfer rate of the first one of the communication sessions is lower than the value by a threshold amount.

In still further examples, the portions of the field data set are chunks of the data set. In some such further example, the operations include using a chunking technique to obtain the chunks of the data set, and distributing the chunks to the respective ones of the plurality of communication devices. In some examples, distributing the chunks to the respective ones of the plurality of communication devices includes monitoring respective input queues of the respective communication devices to determine when the respective input queues are empty, and distributing respective chunks to ones of the respective input queues when the ones of the respective input queues are empty.

An example transceiver station to transfer data to a network access point disclosed herein includes a memory including machine readable instructions and a processor to execute the instructions to perform operations. Such example operations can include transmitting portions of a field data set to a network access point in parallel via a plurality of communication sessions established by respective ones of a plurality of communication devices with the network access point and comparing a respective data transfer rate of a first one of the communication sessions associated with a first one of the communication devices to a value based on a respective data transfer rate of a second one of the communication sessions to determine whether to terminate the first one of the communication sessions. Further example operations include, in response to determining to terminate the first one of the communication sessions, instructing the first one of the communication devices to terminate the first one of the communication sessions and to re-establish a new communication session with the network access point to transmit a respective portion of the field data set to the network access point.

In some examples, comparing the respective data transfer rate of the first one of the communication sessions associated with the first one of the communication devices to the value based on the respective data transfer rate of the second one of the communication sessions to determine whether to terminate the first one of the communication sessions includes determining whether the respective data transfer rate of the first one of the communication sessions is lower than the value by a threshold amount.

In some examples, the portions of the field data set are chunks of the data set, and further example operations include using a chunking technique to obtain the chunks of the data set, and distributing the chunks to the respective ones of the plurality of communication devices.

In still further examples, distributing the chunks to the respective ones of the plurality of communication devices includes monitoring respective input queues of the respective communication devices to determine when the respective input queues are empty, and distributing respective chunks to ones of the respective input queues when the ones of the respective input queues are empty.

The increasing numbers of available methods and apparatus used to collect field data is resulting in the creation of very large data sets (e.g., data sets that are several terabytes in size). In many instances, such very large data sets are collected in remote areas that are not necessarily coupled via cable or other wired data transmission means to a data center. Thus, the data sets must be transmitted wirelessly to a data center where the valuable information contained in the data sets can be extracted via analysis. In many instances, the information contained in such large data sets has a limited shelf-life (days and even hours). As such, rapid transmission of the data sets is critical to reaping any benefit from the data.

Unfortunately, existing wireless communication methods and apparatus are not typically capable of data transmission rates high enough to enable timely transmission and analysis of very large data sets. Thus, it is desirable to improve on existing methods of wirelessly communicating very large data sets. The methods, systems and apparatus disclosed herein improve the data transmission rates obtainable using wireless communication by breaking the very large data sets into smaller portions, transmitting the portions via using parallel communication sessions, and monitoring the data transmission rates achieved via the individual data communication sessions. Further, the methods, system and apparatus disclosed herein use the data transmission rates to determine whether to terminate a communication session and re-initiate a new communication session. Thus, a communication session that is performing poorly relative to others of the communication sessions can be selectively terminated and re-initiated in an attempt to obtain a faster data communicate rate for the poorly performing communication session thereby improving the overall data transmission rate for the data set as a whole.

Moreover, the methods, systems and apparatus disclosed herein can determine an amount of collective bandwidth obtained when a threshold number of communication sessions are transmitting data. Further, the methods, systems and apparatus can prevent (or enable) the initiation of additional communication sessions (or turn off a selected number of previously-initiated communication sessions) when the initiation of such additional communication sessions fails to result in an appreciable increase in overall data transmission bandwidth. Thus, the methods, systems and apparatus disclosed herein control the number of communication sessions being used to communicate the data set in parallel.

FIG. 1 is a block diagram illustrating a data collection and transmission system 100 having an example unmanned aerial vehicle (UAV) 102, an example sensing base station 104, an example high capacity field data transceiver 106, an cellular telecommunication tower 108, and an example high capacity cloud data transceiver 110. In some examples, the UAV 102 captures images of a field 112 in which an agricultural crop is being cultivated and transmits image data to the sensing base station 104. Some such example transmissions may occur over a wireless channel operating at an authorized frequency (e.g., 2.1 GHz (an unlicensed frequency band), one of the frequency bands currently assigned for usage by commercial WiFi applications, or (depending on the user) one of the frequency bands currently assigned for usage by military or law enforcement applications, etc). Some such example transmissions may use a WiFi band and a MAC layer to transmit the image field data. Some such example transmissions may use other frequencies and and/or other wireless network protocols.

In some examples, the sensing base station 104 stores the image data for retrieval by the high capacity field data transceiver 106. In some examples, the high capacity data transceiver 106 divides the image data into portions and transmits the portions via an example set of parallel communication sessions 114 to the cellular telecommunication tower 108. In some examples, the cellular communication tower 108 transmits the received portions of the data set to the high capacity cloud data transceiver 106 via a set of parallel data communication streams 116. In some examples, the parallel data communication streams 116 are transmitted via the Internet 118. In some example, the high capacity cloud data transceiver 110 can be located anywhere in the cloud 120. Although in this example, the Internet 118 is depicted as a means to access the cloud 120, the Internet can also be described as encompassing the cloud 120.

Figure 2:
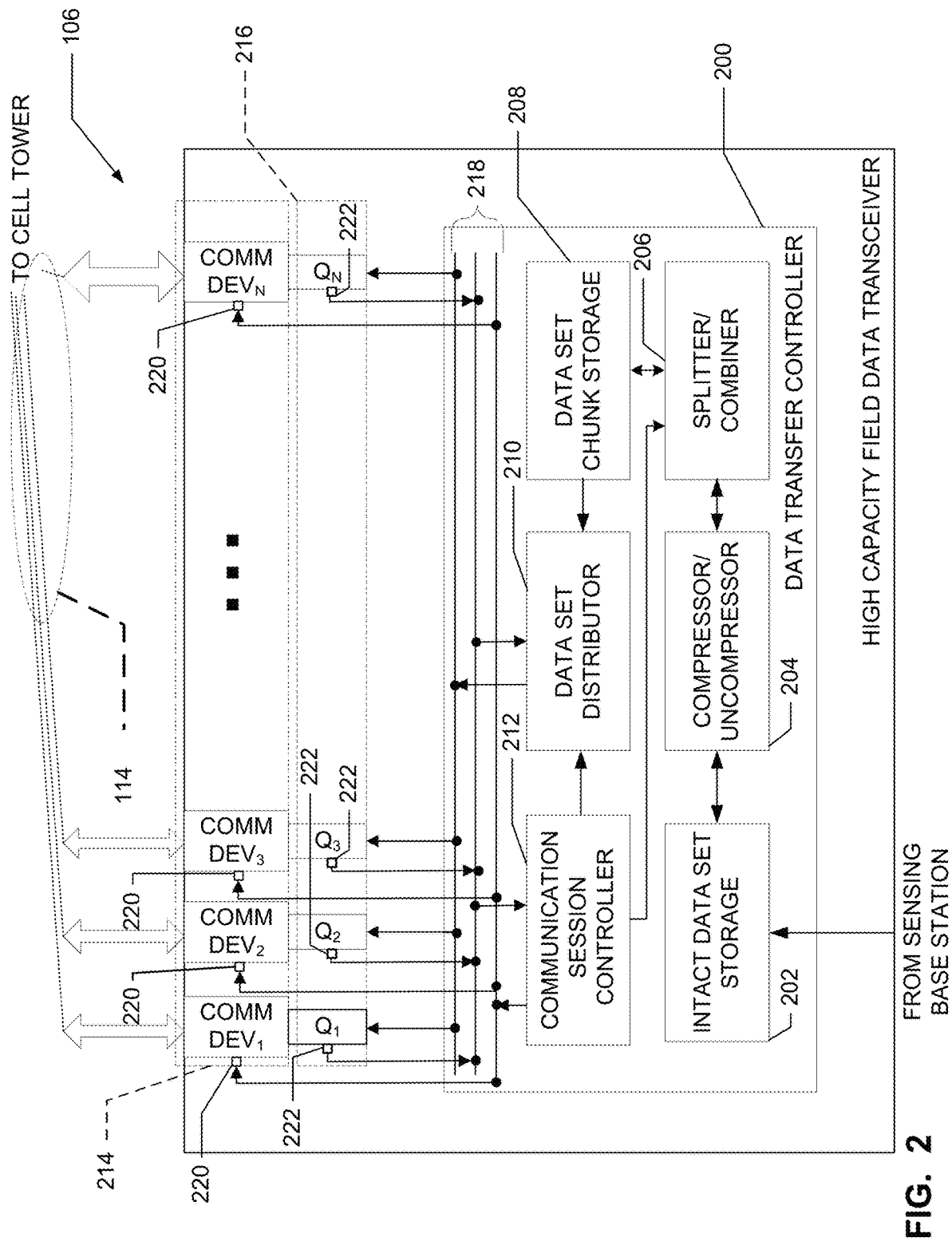
FIG. 2 is a block diagram of the example high capacity field data transceiver illustrated in FIG. 1 including an example transmission controller.

FIG. 2 is a block diagram illustrating the example high capacity field data transceiver 106 illustrated in FIG. 1. In some examples, the high capacity field data transceiver (HCDFT) 106 includes an example data transfer controller 200 having an example intact data set storage 202, an example compressor/uncompressor 204 (referred to herein as a compressor), an example splitter/combiner 206 (referred to herein as a splitter), an example data set chunk storage 208, an example data set distributor 210, and an example communication session controller 212. In some examples, the data transfer controller 200 controls the transfer of the data set stored at the example sensing base station 104 (see FIG. 1) to the example cellular telecommunication tower 108 via an example set of communication devices 214 (e.g., COMM DEV$_1$, COMM DEV$_2$, COMM DEV$_3$, . . . COMM DEV$_N$), each coupled to a corresponding one of an example set of input queues 216 (e.g., Q$_1$, Q$_2$, Q$_3$, . . . Q$_N$). In some examples, the input queues 216 are coupled to the data transfer controller 200 via one of an example set of communication buses 218. In some examples, the data set stored at the base sensing station 104 is supplied to the intact data set storage 202 for storage and subsequently extracted from the intact data set storage 202 by the compressor 204. The compressor 204 compresses the intact data set using any data compression technique and subsequently supplies the compressed data set to the splitter 206. The splitter 206 divides the compressed data set using any technique including, for example, chunking. The individual portions of the data set (also referred to herein as chunks) are then stored in the data set chunk storage 208 which can be implemented using any type of storage device. The data set chunks are extracted from the data set chunk storage 208 by the data set distributor 210 which controls the distribution of the chunks to the input queues 216 via one of the set of communication buses 218. The communication session controller 212 controls the initiation and termination of the communication sessions 114 by controlling an example set of communication switches 220 each of which is associated with one of the communication devices 214. In some examples, the communication switches 220 are coupled to the communication session controller 212 via one of the communication buses 218.

In some examples, an example set of monitors 222 are each coupled to one of the example input queues 216 and are further coupled to the data set distributor 210 and to the example communication session controller 212 via one or more of the example set of communication buses 218. In some examples, each of the monitors 222 determines when a corresponding one of the input queues 216 is empty and sends a pulse containing information identifying the empty input queue 216 to the data set distributor. The data set distributor responds to the pulse by supplying a next set of the chunks to the identified input queue. In some examples, each of the monitors 222 also sends the pulse containing information identifying the empty input queue 216 to the communication session controller 212 which uses the information to determine a data transfer rate of the communication device 214 corresponding to the empty input queue 216. As described in further detail below, the communication session controller 212 then uses the data transfer rates to control the initiation and termination of the individual communication sessions 114 via the communication device switches 220.

Figure 3A:
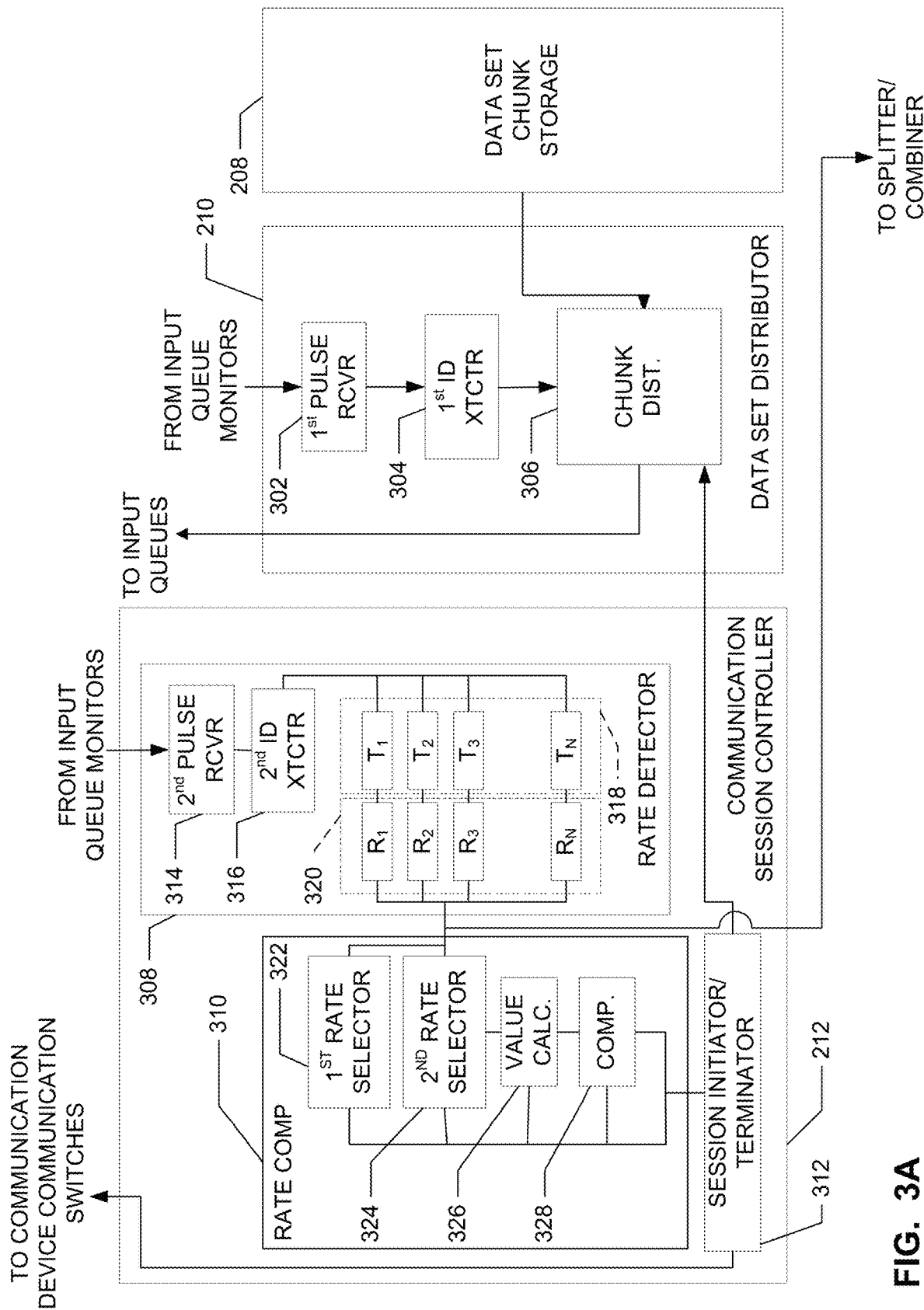
FIG. 3A and FIG. 3B is a block diagram collectively illustrating the the example transmission controller of FIG. 2.
Figure 3B:
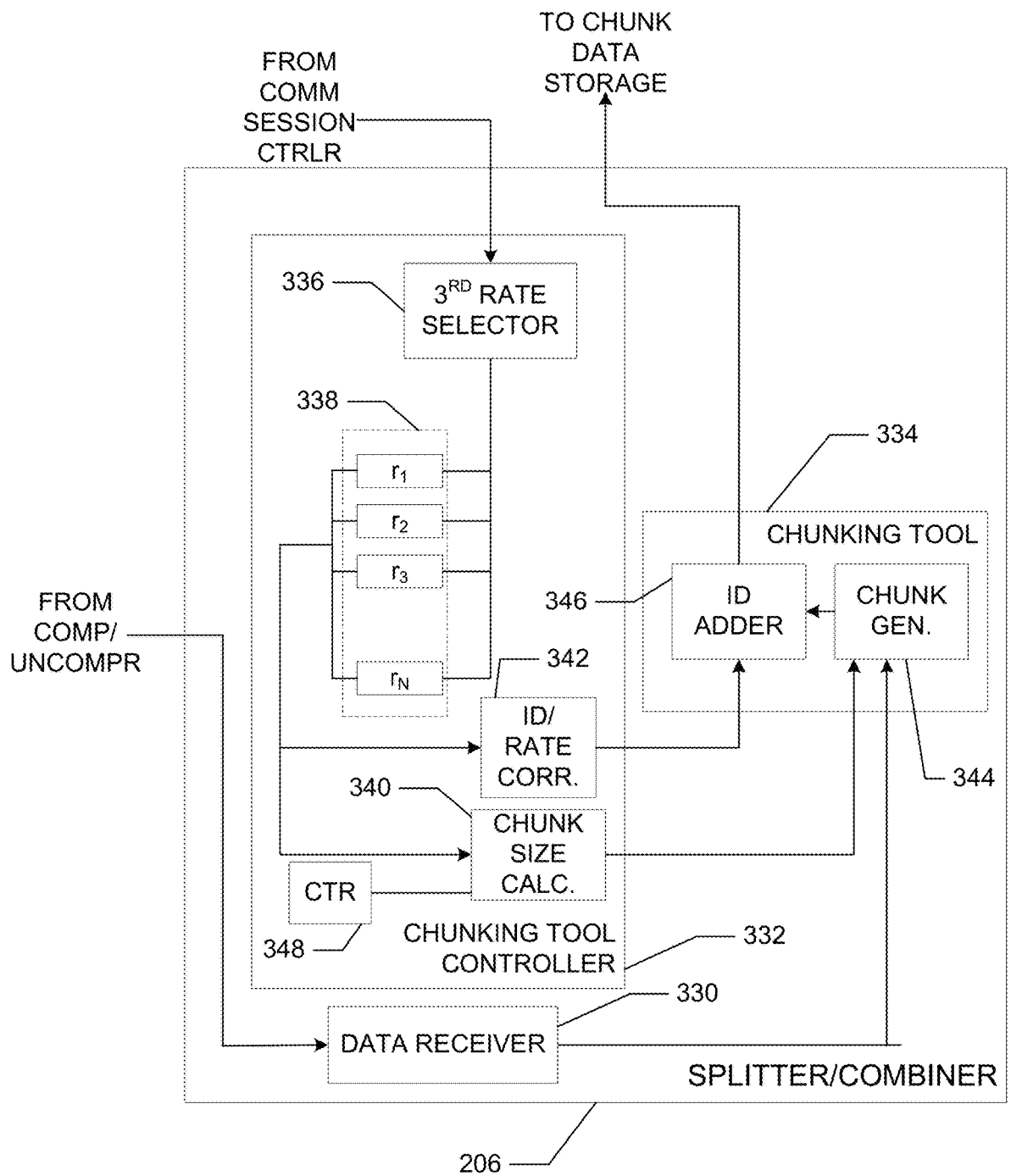

FIG. 3A and FIG. 3B are block diagrams further illustrating some of the components included in the high capacity field data transceiver 106. FIG. 3A illustrates the example communication session controller 212, the example data set distributor 210 and the example data set chunk storage 208 shown in FIG. 2 In some examples, the data set distributor 210 includes a first example pulse receiver 302 by which pulses are received from the input queue monitors 222 (see FIG. 2O. In some examples, each input queue monitor 222 generates a pulse each time a corresponding input queue 216 (see FIG. 2) is empty. The pulses can also include identification information (e.g., address information) uniquely identifying the input queue monitor 222 that generated the pulse. The first pulse receiver 302 provides the received pulses to an example first ID extractor 304 which extracts the identification information included in the pulse and supplies the identification information to an example chunk distributor 306. The chunk distributor 306 responds to the identification information by extracting a next set of chunks from the data set chunk storage 208 and supplying the next set of chunks to a unique one of the example input queues 216 (see FIG. 2) associated with the queue monitor 222 identified via the identification information extracted from the received pulse. In some examples, the chunk distributor 306 numbers the chunks so that the chunks can be reassembled at the example high capacity cloud transceiver 110 (see FIG. 1) based on the corresponding numbers assigned to each. In some examples, the chunks are numbered by the example splitter 206 (see FIG. 2) before being stored in the data set chunk storage 208. Thus, each of the input queues 216 (see FIG. 2) continues to receive a next set of chunks upon transmitting a previous set of chunks.

In some examples, the example communication session controller 212 includes an example rate detector 308, an example rate comparator 310 and an example session initiator/terminator 312. In some examples, the rate detector 308 includes a second example pulse receiver 314, a second example ID extractor 316, an example set of timers 318, and an example first set of rate storage registers 320. The second pulse receiver 314 receives the pulses generated by the example input queue monitors 222 (see FIG. 2) each time a corresponding example input queue 216 (see FIG. 2) is empty as described above and supplies the pulse to the second ID extractor 304. The second ID extractor 304 extracts the identification information included in the pulse. As described, the identification information uniquely identifies a corresponding one of the input queue monitors 222. The identification information extracted by the second ID extractor 316 is then used to pause one of the set of timers 318. In some examples, each of the timers 318 corresponds to one of the input queues 216 (e.g., a first timer $T_1$ corresponds to a first input queue $Q_1$, a second timer $T_2$ corresponds to a second input queue $Q_2$, etc.). As such, if the identification information extracted by the ID extractor 316 from a received pulse corresponds to an input queue monitor 222 that monitors the first input queue $Q_1$, the second ID extractor 316 causes the first timer $T_1$ to pause. Likewise, if the identification information extracted from a received pulse corresponds to an input queue monitor 222 that monitors the second input queue $Q_2$, the second ID extractor 316 causes the second timer $T_2$ to pause, and so on. When any of the timers 318 pauses, a corresponding one of the rate storage registers 320 latches the time at which timer 318 paused thereby capturing an amount of time (e.g., seconds) that has elapsed since the last time a pulse was received for that timer. As a result, each of the first set of rate storage registers 320 holds a rate (chunks per second) at which a set of chunks are being moved through a corresponding one of the input queues 216 to a corresponding one of the example communication devices 214 (see FIG. 2). Thus, each of the rates stored in the first set of rate storage registers 320 reflects a speed (or data transfer rate) at which a corresponding one of the communication devices 214 is transmitting chunks.

Referring still to FIG. 3A, the example rate comparator 310 is configured to compare the rates stored in the example first set of rate storage registers 320 of the example rate detector 308 and to supply the resulting comparison to the example session initiator/terminator 312 for use in determining whether to initiate or terminate a communication session. In some examples, the rate comparator 310 includes a first example rate selector 322, a second example rate selector 324, an example value calculator 326, and an example comparator 328. In some examples, the first rate selector 322 selects one of the rates stored in the example first set of rate storage registers 320 and the second rate selector 324 selects another of the rates stored in the example first set of rate storage registers 320. The value calculator 326 then determines a value against which the rate selected by the first rate selector 322 is to be compared. In some examples, the value calculator 326 selects the rate selected by the second rate selector 324 as the value to which to the rate selected by the first rate selector 322 is to be compared. In some examples, the second rate selector 324 is configured to select all or a subset of the rates stored in the first set of rate storage registers 320 and is configured to supply the selected rates to the value calculator 326. In some such examples, the value calculator 326 uses the rates supplied by the second rate selector 324 to calculator a value against which the rate selected by the first rate selector 322 is to be compared. In some examples, the value calculator 326 calculates a median value of the rates supplied by the second rate selector 324. In some examples, the value calculator 326 calculates an average value of the rates supplied by the second rate selector 324. In fact, the value calculator 326 can be configured to calculates any desired value based on the rates supplied by the second rate selector 326. In some examples, the first rate selector 322 is configured to select multiple ones of the rates from the example first set of rate storage registers 320 and to supply the multiple ones of the rates to the value calculator 326. In some examples, the value calculator 326 uses the set of multiple rates supplied by the first rate selector 322 to calculate a value. For example, the value calculator may determine a median value, an average value, etc. based on the set of rates selected by the first rate selector 322.

The example value calculator 326 supplies the calculated value to the example comparator 328 and the rate selected by the first example rate selector 322 is supplied to the comparator 328. In some examples, the value calculated based on the set of rates selected by the first rate selector 322 is supplied to the comparator 328 for comparison to the value calculated based on the rates selected by the second rate selector 324. The comparator 328 compares the received information to determine which of the 1) rate selected by the first rate selector 322 (or the value calculated based on the rates selected by the first rate selector 322) or 2) the rate selected by the second rate selector 324 (or the value calculated based on the rates selected by the second rate selector 324) is larger. In some examples, the comparator 328 is configured to determine an amount by which the 1) rate selected by the first rate selector 322 and 2) the value calculated by the value calculator 326 is larger (or smaller) than the other. In some examples, if the rate selected by the first rate selector 322 is less than the value calculated by value calculator 326, the comparator 328 is configured to determine whether the rate selected by the first rate selector 322 is less than the value calculated by value calculator 326 by a threshold amount. The outcome of the comparison operation performed by the comparator 328 is supplied to the example session initiator/terminator 312 for use in determining whether to initiate/terminate any of the communication sessions. In addition to supplying the outcome of the comparison to the session initiator/terminator 312, the value calculator 326 is configured to supply information identifying which of the example communication devices 214 is/are associated with the rates selected by the first and second rate selectors 322, 324.

Referring still to FIG. 3A, the example session initiator/terminator 312 uses the outcome of the comparison performed by the example comparator 328 to determine whether to terminate any of the communication sessions 114. In some examples, the session initiator/terminator 312 terminates a selected one (or more) of the communication sessions 114 by sending an instruction to terminate to a corresponding one of the example communication device switches 220 (see FIG. 1) via one of the example buses 218. In some examples, the session initiator/terminator 312 will terminate a select one of the communication sessions 114 when the data rate transfer associated with the select one of the communication sessions 114 is determined by the example comparator 328 to be less than a data transfer rate associated with another of the communication sessions 114. In some examples, the session initiator/terminator 312 will terminate a select one of the communication sessions 114 when the data rate transfer associated with the select one of the communication sessions 114 is determined by the example comparator 328 to be less than a data transfer rate associated with another of the communication sessions 114 by a threshold amount. In some examples, the session initiator/terminator 312 will terminate a select one (or a select set) of the communication sessions 114 when the data rate transfer of the select one (or the value calculated based on the select set) of the communication sessions 114 is determined by the example comparator 328 to be less than a value calculated by the value calculator 326 based on multiple ones of the data transfer rates of multiple ones of the communication sessions 114. In some examples, the session initiator/terminator 312 will terminate a select one of the communication sessions 114 when the data transfer rate of the select one of the communication sessions 114 is determined by the example comparator 328 to be less than a value calculated by the value calculator 326 based on multiple ones of the data transfer rates of multiple ones of the communication sessions 114 by a threshold amount. In some examples, the session initiator/terminator 312 will terminate a first selected set of multiple ones of the communication sessions 114 when a value based on the data transfer rate of the first selected set of communication sessions 114 is determined by the example comparator 328 to be less than a value based on a selected set of multiple ones of the data transfer rates of a second selected set of multiple ones of the communication sessions 114. In some examples, the first selected set of communication sessions and the second selected set of communications sets are, but need not be, mutually exclusive.

The example session initiator/terminator 312, in addition to being configured to terminate select ones of the example communication sessions 114, is also configured to initiate select one of the communication sessions 114. In some examples, when the session initiator/terminator 312 terminates a communication session associated with a select one of the communication devices 214, the session initiator/terminator 312 subsequently initiates a new communication session using the select one of the communication devices 214. In some examples, the session initiator/terminator 312 waits a threshold amount of time before initiating the new communication session via the select one of the communication devices 214. In some examples, the session initiator/terminator 312 is configured to initiate new communication sessions 114 on a first set of the communication devices 214 at a same time. In some examples, the session initiator/terminator 312 is configured to cause the rate comparator 310 to determine a data transfer rate of one or more of the newly initiated communication sessions and to determine whether to initiate additional communication sessions on a second set of the communication devices 214 based on the determined data transfer rate. In some examples, the session initiator/terminator 312 is configured to initiate a first set of communication sessions 114 on a first set of the communication devices 214 and to subsequently initiate a second set of communication sessions 114 on a second set of the communication devices 214. In some examples, the session initiator/terminator 312 initiates the second set of communication sessions 114 based on whether a first value calculated based on the data transfer rates of the first set of communication devices is greater or less than a second value calculated based on the data transfer rates of the second set of communication devices. In some examples, the session initiator/terminator 312 initiates the second set of communication sessions 114 based on whether first value is greater or less than the second value by a threshold amount. In some examples, the first and second values are calculated by the example value calculator 326 of the example rate comparator 310. In some examples, the session initiator/terminator 312 instructs the example first and second rate selectors 322, 324 as to the rates to be selected.

In some examples, the example high capacity field data transceiver 106 of FIG. 1 and FIG. 2 is able to both transmit and receive data. In some such examples, the streams containing the data chunks are received from, for example, the example high capacity cloud data transceiver 110 at the example communication devices 214. Each communication device supplies the received data chunks to the example data set chunk storage 208 and the example splitter 206, detecting the storage of newly received data chunks in the data set chunk storage 208, begins to reassemble the newly received data chunks into a sequential order based on, for example a unique chunk number stored with each data chunk. Finally, the splitter/combiner 206 recombines the individual chunks into a single data stream. The splitter/combiner 206 then supplies the single data stream to the example compressor/uncompressor 204 which operates to uncompress the set of single data stream. The compressor/uncompressor 204 causes the uncompressed data set to be stored in the example intact data set storage 202. Thus, the compressor 204 can operate to both compress and uncompress the data set and the splitter 206 can operate to both divide the original, compressed data set into a set of numbered chunks and reassemble the data chunks into a single, compressed stream of data.

As described above, FIG. 3A and FIG. 3B are block diagrams further illustrating some of the components included in the high capacity field data transceiver 106. FIG. 3B illustrates the example splitter/combiner 206 included in the high capacity field data transceiver 106. In some examples, the high capacity field data transceiver 106 is configured to adaptively generate larger chunks to be transmitted via the example wireless communication devices 214 that are communicating at a faster transmission rate and smaller chunks to be transmitted via the wireless communication devices 214 that are communicating at a slower transmission rate. In some such examples, the example splitter/combiner 206 includes an example data receiver 330, an example chunking tool controller 332, and an example chunking tool 334. The example data receiver 330 receives the compressed (or uncompressed) data from the example compressor/uncompressor 204 (see FIG. 2) and supplies the data to the chunking tool 334 for use in generating chunks, as described further below. In some examples, the chunking tool controller 332 controls the size of the chunks generated by the chunking tool 334. In some such examples, the chunking tool controller 332 includes an example third rate selector 336, an example second set of rate storage registers ($r_1, r_2, r_3, \ldots r_N$) 338, an example chunk size calculator 340 and an example ID/rate correlator 342. As described above, a transmission rate at which a corresponding one of the wireless communication devices 214 is transmitting chunks is stored in an example first set of rate storage registers ($R_1, R_2, R_3, \ldots R_N$) 320 (see FIG. 3A). In some such examples, the third rate selector 336 selects the rates stored in the first set of rate storage registers 320 and places them into corresponding ones of the second set of rate storage registers ($r_1, r_2, r_3, \ldots r_N$) 338. As such, the transmission rate associated with the first of the wireless communication devices 214 is stored in a first of the second set of rate storage registers 338, the transmission rate associated with the second of the wireless communication devices 214 is stored in a second of the second set of rate storage registers 338, and so on. Because the transmission rates of the wireless communication devices 214 may be (and likely are) changing over time, the third rate selector 336 can be configured to periodically (or aperiodically) select the rates stored in the first set of rate storage registers 320 and place the selected rates into corresponding ones of the second set of rate storage registers 338. The chunk size calculator 340 is configured to receive or extract the rates from the second set of rate storage registers 338 and to use the rates to calculate a size(s) for the chunks to be generated by the chunking tool 334. In some examples, the chunk size calculator 340 calculates a large size for chunks to be transmitted by wireless communication devices 214 having a faster transmission rate. Conversely, the chunk size calculator 340 can calculate a smaller size for chunks to be transmitted by wireless communication devices 214 having a slower transmission rate. The chunk size (calculated based on an extracted transmission rate) is supplied to the chunking tool 334 for use in generating a chunk having the calculated size.

In some examples, the example ID/rate correlator 342 of the example chunking tool controller 332 determines which of the input queues monitors 216 is associated with a transmission rate that has been extracted from the second set of rate storage registers 338 by the example chunk size calculator 340. As such, if the rate $r_1$ (stored in the first of the second set of rate storage registers 338) is selected by the chunk size calculator 340 for use in calculating a chunk size, the ID/rate correlator 342 determines the ID of the corresponding input queue monitor 222. In some examples, the ID/rate correlator 342 accesses information associating each of the second set of registers with a corresponding input queue monitor ID such that when a rate is extracted from a selected one of the second set of rate registers 338, the corresponding input queue monitor ID can be determined. Upon identifying the input queue monitor ID corresponding to an extracted rate, the ID/rate correlator 342 supplies the input queue monitor ID to the chunking tool 334 for use in assigning an input queue 216 to a chunk(s) generated with the calculated size. In some examples, the example chunking tool 334 includes an example chunk generator 344, an example ID adder 346 and an example counter 348. The chunk generator 344 uses the chunk size supplied by the chunk size calculator 340 to generate one or more data chunks having the calculated size based on data supplied by the example data receiver 330. In addition, the ID adder 346 associates the generated chunks with the input queue monitor ID supplied by the ID/rate correlator 342. The chunk(s) is then supplied to the example chunk data storage 208 (see FIG. 2). In some examples, the chunk is stored in the chunk data storage 208 along with the input queue monitor ID such that the example data set distributor 210 (see FIG. 2), upon extracting the chunk from the data set chunk storage 208, can distribute the chunk to the input queue 216 corresponding to the input queue monitor 222 having the input queue monitor ID. Thus, the example splitter/combiner 206 can, in some examples, adaptively generate larger sized chunks to be transmitted by the wireless devices 214 having a faster transmission rate and adaptively generate smaller sized chunks to be transmitted by the wireless devices 214 having a slower transmission rate. Any method can be used by the chunk size calculator 340 to calculate a chunk size based on a transmission rate. In some examples, the counter 348 is used to determine when a chunk size has been calculated for all of the transmission rates stored in the second set of rate storage registers 338 as described below. Although the example splitter/combiner 206 is described as having an example chunking tool controller 332 to control the size of chunks generated by the example chunking tool 334. The splitter/combiner 206 may instead (or additionally) include any other components needed to generate chunks having sizes that are based on the rates of the example input queues 216. For example, the chunking tool controller 332 may use any desired method to determine chunk sizes that are appropriate for the transmission rates and may use any desired method to ensure that the chunk sizes calculated based on the transmission rates are associated with the appropriate one of the corresponding input queues.

Referring to FIG. 1, FIG. 2, FIG. 3A and FIG. 3B, in some examples, the example high capacity cloud data transceiver 110 is implemented to include the same components installed in the example high capacity field data transceiver 106 except that the example wireless communication devices 214 installed in the high capacity field data transceiver 106 are replaced with example software data receivers (e.g., an IP input/output port) when installed in the high capacity cloud data transceiver 110. Thus, the high capacity cloud data transceiver 110 is capable of performing the same functionality as the high capacity field data transceiver 106, except that the high capacity cloud data transceiver communicates via the Internet with the cellular telecommunication tower 108 (see FIG. 1).

In some such examples, the example IP input/output ports installed in the high capacity cloud data transceiver 110 are each associated with a corresponding one of the wireless communication devices 214 installed in the high capacity field data transceiver 106. In some such examples, when any of the IP input/output devices begin a transmission of chunks to the corresponding one of the wireless communication devices, the respective IP input/output port uses information identifying the corresponding wireless communication device as the destination address to which the chunks are to be transmitted. The transmission rate of the IP input/output port is monitored in the same manner as the transmission rates of the wireless communication devices are monitored in the high capacity field data transceiver 106 (e.g., by tracking the number of chunks being transmitted over a threshold period of time) and select ones of the IP communication sessions may be identified for termination in the manner described above (e.g., based on the rate of the communication). When a communication is identified for termination, the respective one of the IP input/output ports is instructed to tear down the communication by which the chunk transmission is occurring and, in some examples, to re-initiate a new communication session to the corresponding wireless device in an attempt to improve the transmission rate.

In some examples, the high capacity cloud data transceiver can be used to transfer a new software load to a large field full of sensors. Another application would include loading video content into high capacity field data transceivers operating as edge caches for accessibility to large crowds. In one example, the edge cache is located at a large public (or nonpublic) event (e.g., a sporting event, a political convention, a concert, etc.) Mobile device users at the large public event can then access the downloaded video inexpensively and locally over high-speed WiFi, for example, without using a cellular network. In some examples, the cellular telecommunications tower 108 supports long term evolution (LTE) technology, GSM technology or 3G technology.

Referring still to FIG. 1, FIG. 2, FIG. 3A, and FIG. 3B, in some examples, the high capacity field data transceiver is capable of compressing the field data prior to transmission and is further capable of uncompressing data that is received from the high capacity cloud data transceiver. In some examples, the high capacity field data transceiver has data compression capabilities but not data uncompression capabilities and the high capacity cloud data transceiver has data uncompression capabilities but not data compression capabilities. In some examples, the high capacity field data transceiver has data uncompression capabilities but not data compression capabilities and the high capacity cloud data transceiver has data compression capabilities but not data uncompression capabilities. In still other examples, neither the high capacity field data transceiver nor the high capacity cloud data transceiver have compression or uncompression capabilities.

While an example manner of implementing the high capacity field data transceiver 106 and the high capacity cloud data transceiver 110 of FIG. 1 is illustrated in FIG. 2, FIG. 3A, and in FIG. 3B one or more of the elements, processes and/or devices illustrated in FIG. 2 and/or FIGS. 3A and 3B may be combined, divided, re-arranged, omitted, eliminated and/or implemented in any other way. Further, the example data transfer controller 200, the example intact data set storage 202, the example compressor 204, the example splitter 206, the example data set chunk storage 208, the example data set distributor 210, the example communication session controller 212, the example communication devices and/or the example software data receivers 214, the example the example input queues 216, and the example communication buses 218, the example communication device switches 220, the example input queue monitors 222, the example first pulse receiver 302, the example first ID extractor 304, the example chunk distributor 306, the example rate detector 308, the example rate comparator 310, the example session initiator/terminator 312, the example second pulse receiver 314, the example second ID extractor 316, the example timers 318, the example first set of rate registers 320, the example first rate select 322, the example second rate selector 324, the example value calculator 326, the example comparator 328, the example data receiver 330, the example chunking tool controller 332, the example chunking tool 334, the example third rate selector 336, the example second set of rate storage registers 338, the example chunk size calculator 340, the example ID/rate correlator 342, the example chunk generator 344, the example ID adder 346, the example counter 348 and/or, more generally, the example high capacity field data transceiver 106 and/or the example high capacity cloud data transceiver 110 of FIG. 1 may be implemented by hardware, software, firmware and/or any combination of hardware, software and/or firmware. Thus, for example, any of the example data transfer controller 200, the example intact data set storage 202, the example compressor 204, the example splitter 206, the example data set chunk storage 208, the example data set distributor 210, the example communication session controller 212, the example communication devices and/or the example software data receivers 214, the example input queues 216, and the example communication buses 218, the example communication device switches 220, the example input queue monitors 222, the example first pulse receiver 302, the example first ID extractor 304, the example chunk distributor 306, the example rate detector 308, the example rate comparator 310, the example session initiator/terminator 312, the example second pulse receiver 314, the example second ID extractor 316, the example timers 318, the example first set of rate registers 320, the example first rate select 322, the example second rate selector 324, the example value calculator 326, the example comparator 328, the example data receiver 330, the example chunking tool controller 332, the example chunking tool 334, the example third rate selector 336, the example second set of rate storage registers 338, the example chunk size calculator 340, the example ID/rate correlator 342, the example chunk generator 344, the example ID adder 346, the example counter 348 and/or, more generally, the example high capacity field data transceiver 106 and/or the example high capacity cloud data transceiver 110 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example data transfer controller 200, the example intact data set storage 202, the example compressor 204, the example splitter 206, the example data set chunk storage 208, the example data set distributor 210, the example communication session controller 212, the example communication devices and/or the example software data receivers 214, the example input queues 216, and the example communication buses 218, the example communication device switches 220, the example input queue monitors 222 and/or, the example first pulse receiver 302, the example first ID extractor 304, the example chunk distributor 306, the example rate detector 308, the example rate comparator 310, the example session initiator/terminator 312, the example second pulse receiver 314, the example second ID extractor 316, the example timers 318, the example first set of rate registers 320, the example first rate select 322, the example second rate selector 324, the example value calculator 326, the example comparator 328, the example data receiver 330, the example chunking tool controller 332, the example chunking tool 334, the example third rate selector 336, the example second set of rate storage registers 338, the example chunk size calculator 340, the example ID/rate correlator 342, the example chunk generator 344, the example ID adder 346 and the example counter 348 is/are hereby expressly defined to include a tangible computer readable storage device or storage disk such as a memory, a digital versatile disk (DVD), a compact disk (CD), a Blu-ray disk, etc. storing the software and/or firmware. Further still, the example high capacity field data transceiver 106 and/or the example high capacity cloud data transceiver 110 of FIG. 1, FIG. 2 and FIGS. 3A and 3B may include one or more elements, processes and/or devices in addition to, or instead of, those illustrated in FIG. 2 and FIGS. 3A and 3B, and/or may include more than one of any or all of the illustrated elements, processes and devices.

Figure 4:
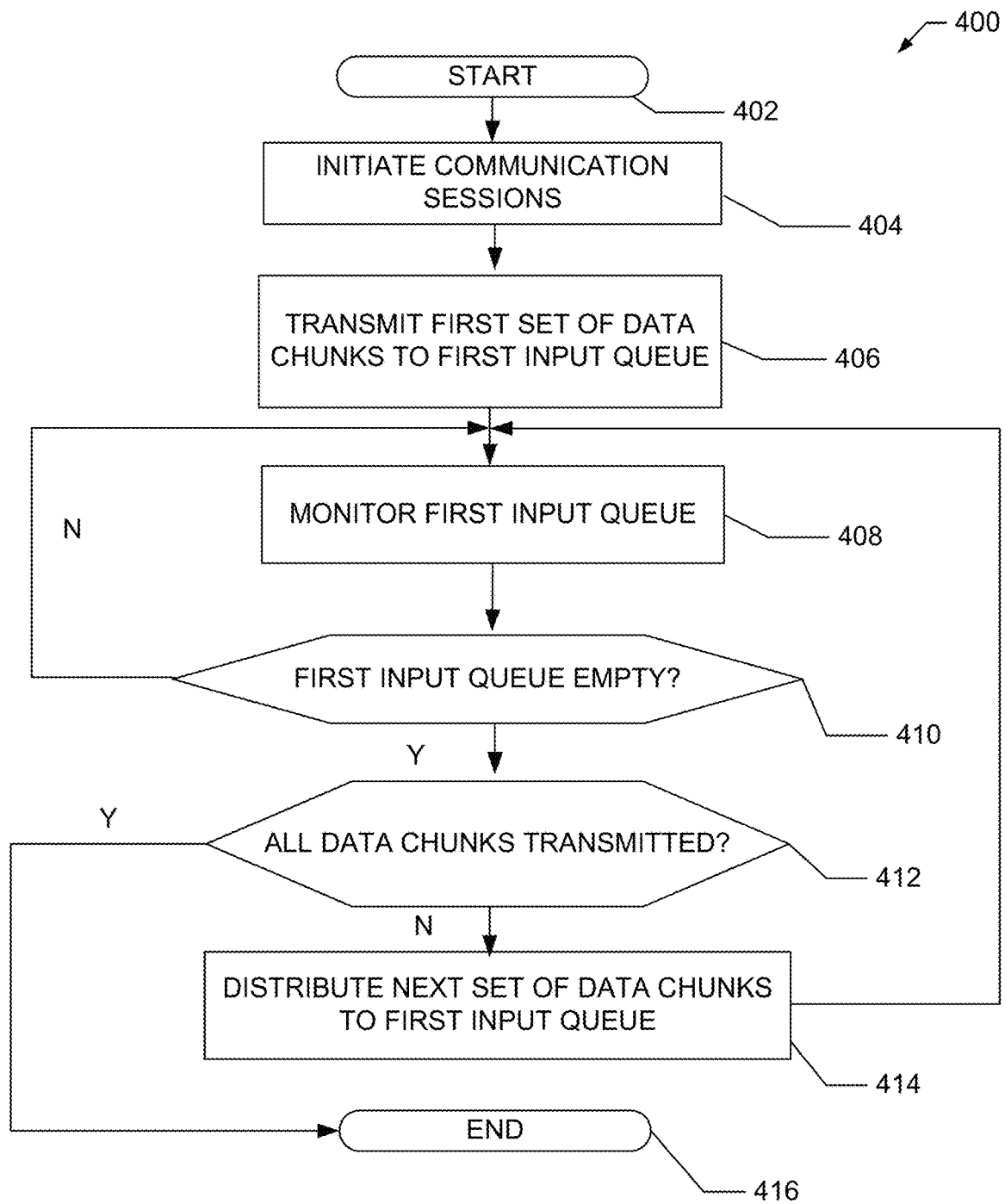
FIG. 4 is a flowchart representative of first example computer readable instructions that can be executed by the example high capacity data transceiver illustrated in FIGS. 1, 2, 3A and 3B.
Figure 5:
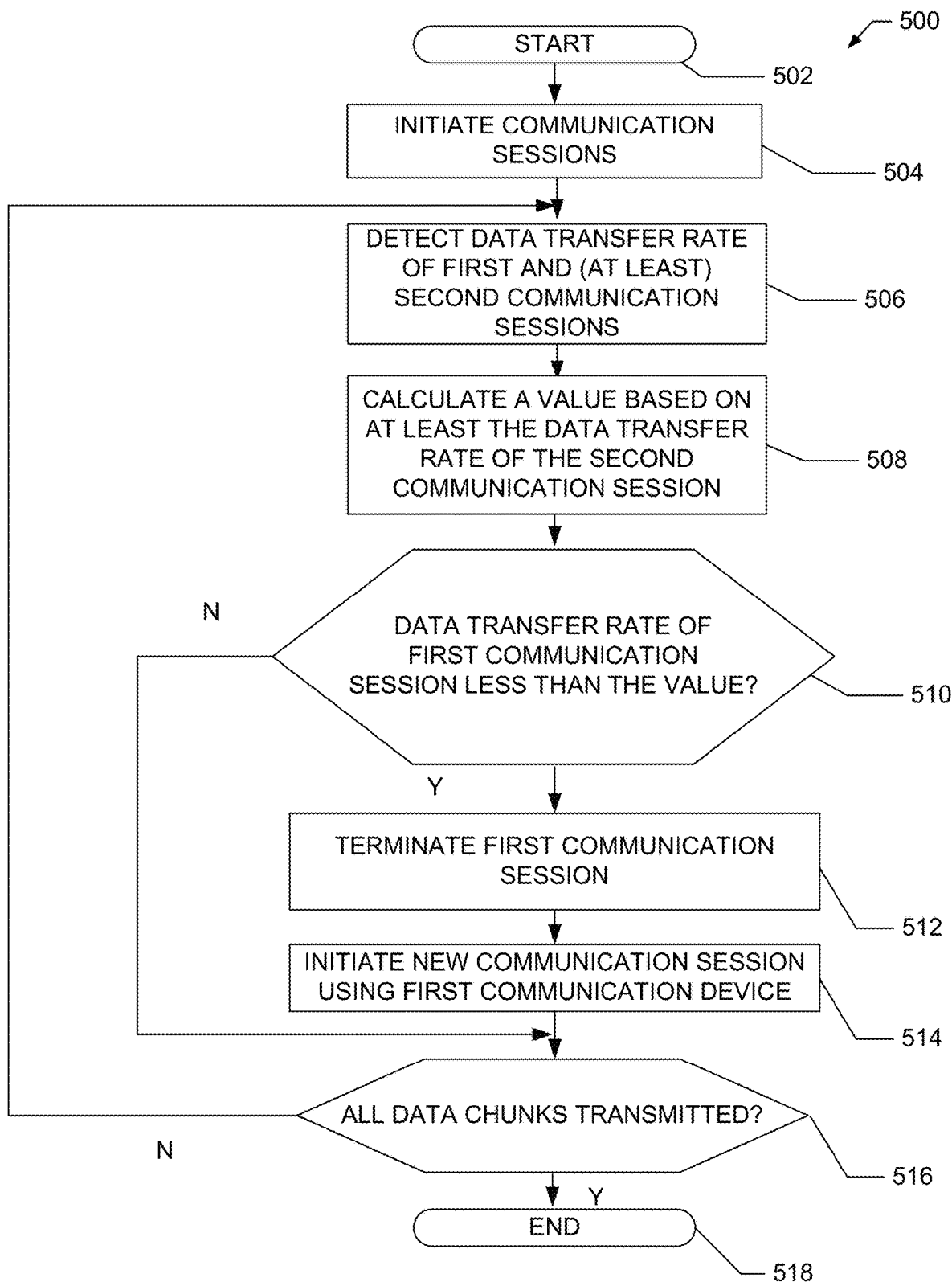
FIG. 5 is a flowchart representative of second example computer readable instructions that can be executed by the by the example high capacity data transceiver illustrated in FIGS. 1, 2, 3A and 3B.
Figure 6:
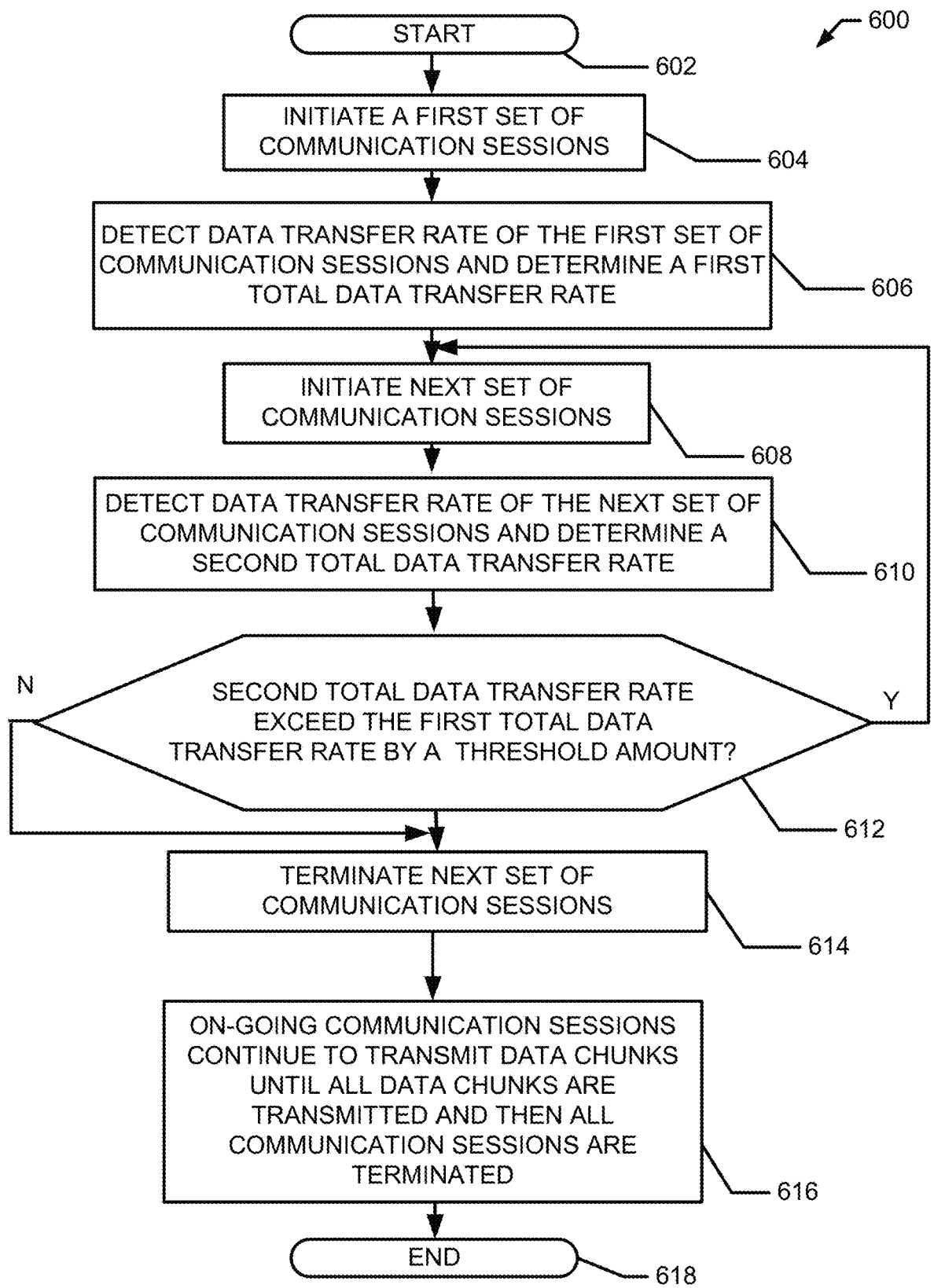
FIG. 6 is a flowchart representative of third example computer readable instructions that can be executed by the example high capacity data transceiver illustrated in FIGS. 1, 2, 3A and 3B.

Flowcharts representative of example machine readable instructions for implementing the high capacity field data transceiver 106 of FIGS. 1, 2, 3A and 3B are shown in FIGS. 4, 5 and 6. In these examples, the machine readable instructions comprise a program for execution by a processor such as the processor 1012 shown in the example processor platform 700 discussed below in connection with FIG. 8. The program may be embodied in software stored on a tangible computer readable storage medium such as a CD-ROM, a floppy disk, a hard drive, a digital versatile disk (DVD), a Blu-ray disk, or a memory associated with the processor 812, but the entire program and/or parts thereof could alternatively be executed by a device other than the processor 812 and/or embodied in firmware or dedicated hardware. Further, although the example programs are described with reference to the flowcharts illustrated in FIGS. 4, 5, and 6 many other methods of implementing the example high capacity field data transceiver 106 and/or the high capacity cloud data transceiver 110 may alternatively be used. For example, the order of execution of the blocks may be changed, and/or some of the blocks described may be changed, eliminated, or combined.

As mentioned above, the example processes of FIGS. 4, 5, and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4, 5, and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 400 of FIG. 4 represents an example method by which the example high capacity field data transceiver 106 controls the transfer of data to the example cell tower 108 (see FIG. 1) for subsequent delivery to an example high capacity cloud data transceiver 110 (see FIGS. 1, 2 and 3). With reference also to FIG. 1, FIG. 2, FIG. 3A and FIG. 3B, the method begins at a block 402 after which the example session initiator/terminator 312 initiates an example set of communication sessions 114 using the example set of corresponding communication devices 214. (See block 404.) The example data set distributor 210 distributes a first set of data chunks to the example first input queue 216 corresponding to the first communication device 214. (See block 406.) After distributing the first set of data chunks, the first example input queue monitor 222 monitors a corresponding example input queue 216 to determine whether the input queue is empty (e.g., whether the first set of data chunks has been transferred by the first communication device 214. (See block 408.) If the first input queue 216 is determined to be empty (block 410), the example chunk distributor 306 of the data set distributor 210 determines whether all data chunks have been distributed. (See block 412.) If all data chunks have not been distributed, the chunk distributor 306 distributes the next set of data chunks to the corresponding input queue 216. (See block 414.) After distributing the next set of data chunks to the first input queue, the input queue monitor 222 continues monitoring the corresponding input queue 216 as described above with respect to block 408. If all data chunks have been distributed as determined by the chunk distributor 306 (see block 414), the method ends. (See block 416.)

The program 500 of FIG. 5 represents an example method by which the example high capacity field data transceiver 106 controls the initiation and termination of the example communication sessions 114 (see FIG. 1). With reference also to FIG. 1, FIG. 2, FIG. 3A, and FIG. 3B, the method begins at a block 502 after which the example session initiator/terminator 312 initiates an example set of communication sessions 114 using the example set of corresponding communication devices 214. (See block 504.) The example rate detector 308 detects a first data transfer rate of a first one of the communication sessions 114 and detects data transfer rates of one or more others of the communication sessions 114 including at least a second data transfer rate of a second one of the communication sessions 114. (See block 506.) The example value calculator 326 determines a value that is based on one or more others of the communication sessions 114 including at least a second data transfer rate of a second one of the communication sessions 114. (See block 508). The example comparator 328 compares the first data transfer rate to the value determined by the value calculator 326 to determine whether the first data transfer rate is less than the determined value. (See block 510.) If the first data transfer rate is less than the value, the session initiator/terminator 312 terminates the first one of the communication sessions 114 (block 512) and subsequently initiates a new communication session using the first one of the communication devices. (See block 514.) If all of the data chunks have been transmitted as determined by the chunk distributor 306 (block 516), the method ends. (See block 518.) If the all of the data chunks have not yet been distributed (see block 516), the method returns to the block 506 and block subsequent thereto, as described above.

In some examples, the example comparator 328 determines whether the first data transfer rate is less than the second data transfer rate by a threshold amount (block 510) and, if so, the session initiator/terminator 312 terminates the first one of the communication sessions 114 (block 512) and subsequently initiates a new communication session via the first one of the communication devices. (See block 514.) Otherwise, the session initiator/terminator 312 does not terminate the first one of the communication sessions (i.e., the method steps described with respect to blocks 512 and 514 are not performed). In some examples, the method of FIG. 5 is repeatedly performed by the high capacity field data transceiver 106 to detect and compare the data transfer rates of each of the communication sessions to the value to thereby determine whether one or more of such communication sessions are to be terminated and to subsequently initiate new communication sessions using the communication devices associated with the terminated communication sessions. In some examples, the value is equal to the second data transfer rate of the second communication session. In some examples, the value is equal to the median of data transfer rates of multiple ones of the communication sessions 114. In some examples, the value is equal to the average (or any other desired measure) of data transfer rates of multiple ones of the communication sessions 114. In some examples, the method of FIG. 5 is repeated by the session initiator/terminator until all of the data transfer rates are within a threshold of the value determined by the value calculator 326.

The program 600 of FIG. 6 represents an example method by which the example high capacity field data transceiver 106 continues to initiate new sets of communication sessions via respective communication devices 214 until the initiation of additional sets of communication sessions fails to appreciably increase the total data transfer achieved by all of the communication sessions combined. With reference also to FIG. 1, FIG. 2, FIG. 3A and FIG. 3B, the method begins at a block 602 after which the example session initiator/terminator 312 initiates an example set of communication sessions 114 using an example set of corresponding communication devices 214. (See block 604.) In some examples, the number of communication sessions included in the first set of communication sessions is predefined. In some examples, the number of communication sessions 114 included in the first set of communication sessions 114 is based on a number of data chunks to be transmitted via the communication sessions 114. In some examples, the number of communication sessions 114 included in the first set of communication sessions is one. The example rate detector 308 detects the data transfer rates of the first set of communication sessions 114 and the value calculator 326 determines a first total data transfer rate achieved using the first set of communication sessions 114. (See block 606.) The session initiator/terminator 312 then initiates a next set of communication sessions 114 using a next set of the communication devices 214. (See block 608.) In some examples, the number of communication sessions 114 included in the first set of communication sessions is one. The rate detector 308 then detects the data transfer rates of the next set of communication sessions 114 and the value calculator 326 calculates a second total data transfer rate achieved using the both the first set of communication sessions 114 and the next set of communication sessions 114. (See block 610). If the second total data transfer rate did exceed the first total data transfer rate by, for example, a threshold amount, (e.g., initiating the next set of communication sessions did result in an appreciable increase in the total data transfer rate of the combined communication sessions 114) (block 612), the method returns to the block 608 at which the session initiator/terminator 312 initiates a next set (yet another set) of communication sessions 114 using yet another set of communication devices 214 (see block 608) and continues to repeat the operations of the method described with respect to the blocks 610 and 612 above. If the second total data transfer rate did not exceed the first total data transfer rate by, for example, a threshold amount, (e.g., initiating the next set of communication sessions did not result in an appreciable increase in the total data transfer rate of the combined communication sessions), the next communication sessions are terminated (e.g., the set of communication sessions 114 that were initiated most recently are terminated). (See block 614). As initiating further communication devices will not result in an appreciable increase in the overall data transfer rate, the on-going communication sessions continue to transmit data until all data chunks have been transmitted at which time all on-going communication sessions are terminated (block 616) and the method ends. (See block 618), Thus, the method of FIG. 6 preserves battery power by initiating a core (first) set of communication sessions and only initiating additional communication sessions when the initiation of such additional sessions appreciably contributes to the total data transfer rate. The initiation of additional communication sessions will not appreciably contribute to the total data transfer rate achieved using all operating communication sessions when, for example, the available bandwidth between the cell tower 108 and the communication devices 214 has become saturated. Note that in some examples, the most recently initiated set of communication sessions 114 are not terminated when the second total data transfer rate fails to exceed the first total data transfer rate (as determined at the block 612) but are instead permitted to continue operating. However, additional communication sessions 114 are not initiated.

In some examples, the example session initiator/terminator 312 can include a core number of communication sessions in the first set of communication sessions and subsequently increase the number of communication sessions in the next set until the total bandwidth fails to appreciably increase, thereby tailoring the number of operating communication sessions 114 to the available bandwidth provided by the cell tower.

Figure 7:
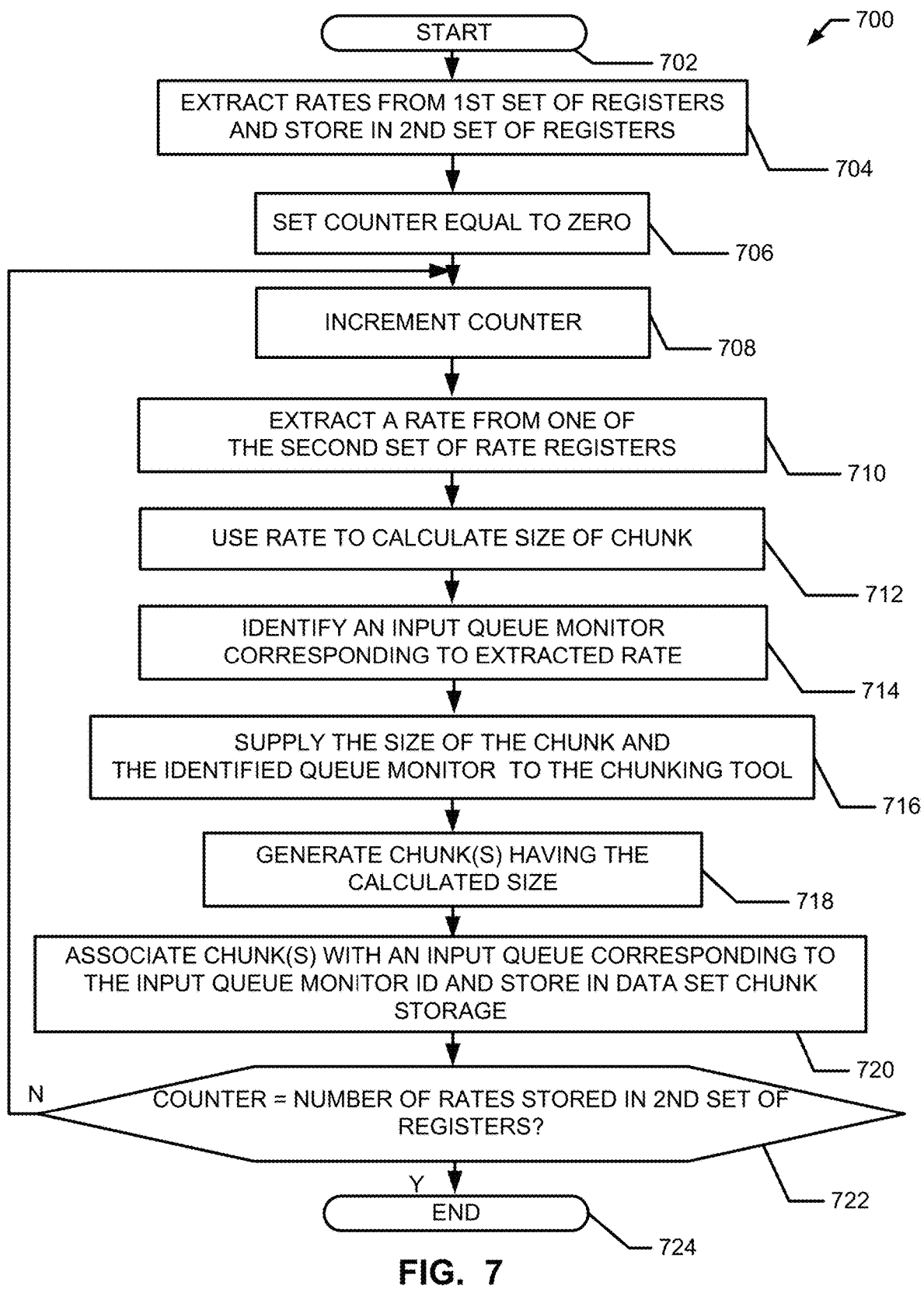
FIG. 7 is a flowchart representative of third example computer readable instructions that can be executed by the example high capacity data transceiver illustrated in FIGS. 1, 2, 3A and 3B.

The program 700 of FIG. 7 represents an example method by which the example high capacity field data transceiver 106 generates a chunk(s) to be transmitted by a wireless communication device 214 based on the rate at which the wireless communication device 214 is transmitting chunks. In some examples, the high capacity field data transceiver 106 is configured to generate larger chunks to be transmitted by ones of the wireless communication devices having a higher transmission rate and to generate smaller chunks to be transmitted by ones of the wireless communication devices 214 having slower transmission rates. With reference also to FIG. 1, FIG. 2, FIG. 3A and FIG. 3B, the method begins at a block 702 after which the example third rate selector 336 selects/extracts the rates stored in the example first set of rate storage registers 320 (see FIG. 3A) and stores the rates in corresponding ones of the example second set of rate storage registers 338 (see FIG. 3B). (See block 704). In addition, the example splitter/combiner 206 of the high capacity field data transceiver 106 sets a counter 348 equal to zero (e.g., i=0). (See block 706). Next, the counter 348 is incremented by one. (See block 708). In some examples, the example chunk size calculator 340 (see FIG. 3B) extracts a first of the rates from a first of the second set of rate storage registers 338. (See block 710). In addition, the chunk size calculator 340 calculates a chunk size based on the rate. (See block 712). The example ID/rate correlator 342 determines an input queue monitor ID corresponding to the rate that was extracted from the second set of rate registers. (See block 714). In some examples, the input queue monitor ID corresponding to a first of the input queues monitors 222 is assumed to correspond to the rate stored in a first of the second set of registers 338 such that if the rate was selected/extracted from the first of the second set of registers 338, the input queue monitor ID is determined to be the input queue monitor ID corresponding to a first of the input queue monitors 222. Likewise, the input queue monitor ID corresponding to a second of the input queues monitors 222 is assumed to correspond to the rate stored in a second of the second set of registers 338 such that if the rate was selected/extracted from the second of the second set of registers 338, the input queue monitor ID is determined to be the input queue monitor ID corresponding to a second of the input queue monitors 222, and so on. After determining the chunk size and the corresponding input queue monitor ID, the chunk tool controller 332 (see FIG. 3B) supplies both pieces of information (e.g., the input queue monitor ID and the chunk size) to the chunking tool 334 (see FIG. 3B). (See 716). In some examples, the example chunk generator 344 (see FIG. 3B) of the chunking tool 334 uses the chunk size to generate a chunk having the specified size (see block 718) and the example ID adder 346 (see FIG. 3B) associates the generated chunk with the input monitor ID supplied by the chunking tool controller 332. (See block 720). In addition, the generated chunk having the associated input monitor ID is supplied to the data set chunk storage 208 (see FIG. 3A). (See also block 720). Next, the counter 348 determines whether the value of i is equal to the number of rates stored in the second set of registers by the third rate selector 336. (See block 722). If so, the method ends, if not the method returns to the operations described with respect to block 708 and the blocks subsequent thereto as described above. In some examples, instead of ending after all of the rates have been used to calculate and generate chunk sizes, the method returns to the operations performed with respect to block 704 and the blocks subsequent thereto. Thus, the rates stored in the first set of rate storage registers 320 are again selected/extracted by the third rate selector 336 and stored in the second set of rate storage registers 338 and the remaining method operations are again performed. Thus, any changes in the transmission rates occurring between the first execution of the method and the second execution of the method will be accounted for during the second execution of the method. In some examples, the method continues in this manner until all chunks have been distributed and the transmissions have completed.

In some examples, when the example data set distributor 210 (see FIG. 3A) determines that one of the input queues 216 (see FIG. 2) is empty, the data set distributor 210 extracts an appropriately sized chunk from the data set chunk storage 208 based on the input queue monitor ID stored with the chunk. In some examples, the chunk size calculator 340 calculates a chunk size for each of the respective input queues and the chunking tool controller 332 supplies the chunk sizes and respective input queue monitor IDs to the chunking tool 334 for storage therein. Subsequently, the chunk generator 344 uses the stored sizes to generate chunks for each of the respective input queues 216 and the ID adder 346 causes the respective input queue monitor ID to be associated with the generated chunks. In some examples, the chunking tool generates the appropriately-sized chunks on an as-needed basis based on a signal supplied by the data set distributor 210. In some such examples, the data set distributor 210, upon determining that an input queue 216 is empty, signals the need for a next chunk to the chunking tool 334 and/or to the data set chunk storage 208, either of which respond by identifying the stored chunk-size previously calculated for the respective input queue and generating a size-appropriate chunk.

Figure 8:
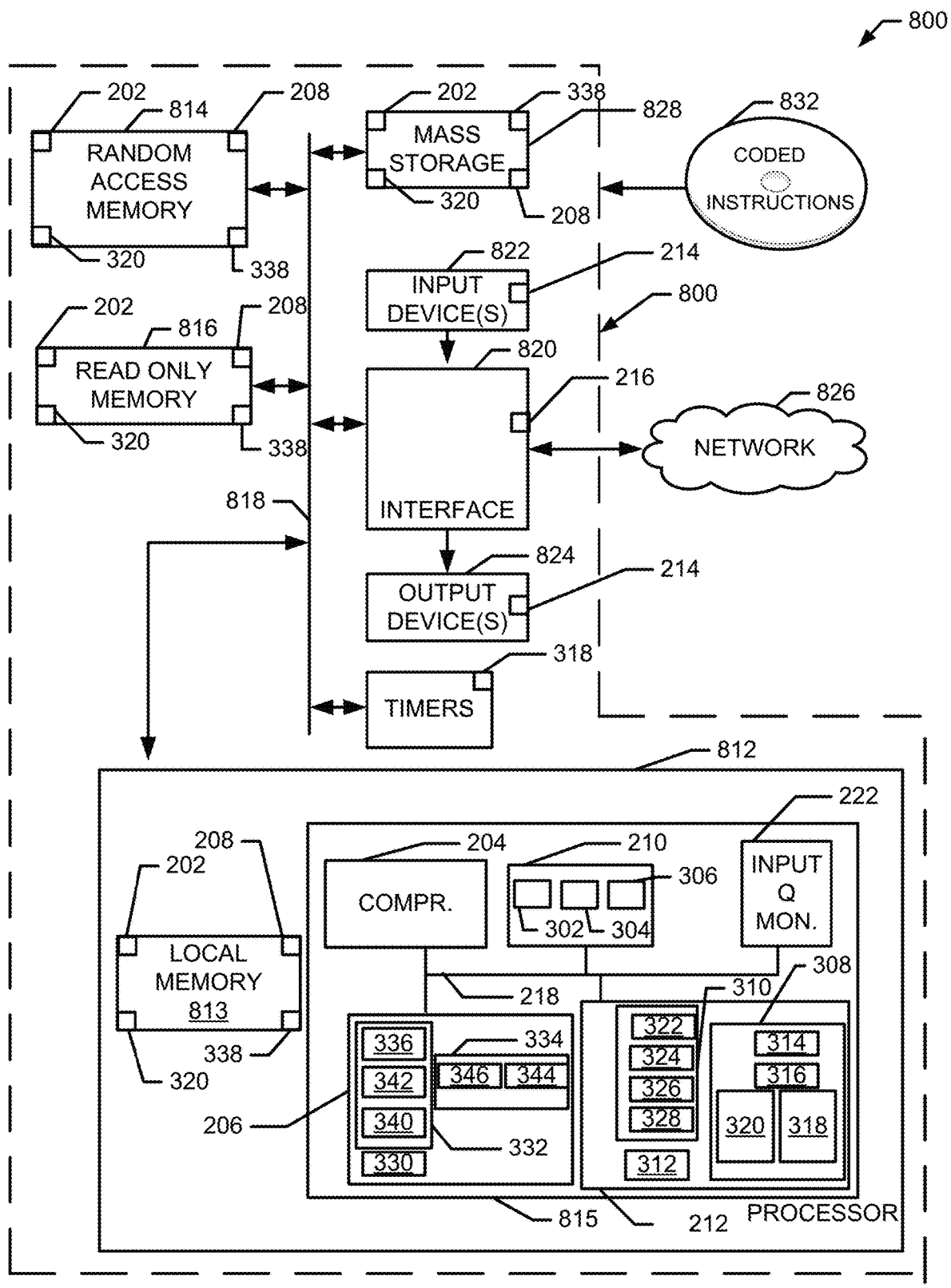
FIG. 8 is a block diagram of an example processor platform structured to execute the example machine readable instructions of FIGS. 4, 5 5, 6 and/or 7 to implement the example high capacity data transceiver illustrated in FIGS. 1, 2 and FIGS. 3A and 3B.

In some examples, the chunking generator 344 is configured to use the data received from the compressor/uncompressor 204 to generate chunks of random size. Subsequently, the respective input queues 216 having faster transmission rates are associated with the larger-sized chunks and the respective input queues 216 having slower transmission rates are associated with the smaller-sized chunks. In some such examples, the transmission rates of the input queues 216 may be ranked in terms of magnitude and the largest of the chunks may be assigned to the input queues 216 having the fastest transmission speed and the smallest of the chunks may be assigned to the input queues 216 having the slowest transmission speed and, so on. In some examples, the chunking generator 344 is configured to use the data received from the compressor/uncompressor 204 to generate chunks of random size. Subsequently, any of the respective input queues 216 having a transmission rate that exceeds a threshold rate may be assigned chunks that are larger than a threshold chunk size. Similarly, any of the respective input queues having a transmission rate that is equal to or less than a threshold rate may be assigned chunks that are smaller than or equal to a threshold chunk size. FIG. 8 is a block diagram of an example processor platform 1000 capable of executing the instructions of FIGS. 4, 5, and 6 to implement the high capacity field data transceiver 106/high capacity cloud data transceiver 110 of FIG. 1, FIG. 2, FIG. 3A and FIG. 3B. The processor platform 800 can be, for example, a server, a personal computer, a mobile device or any other type of computing device.

The processor platform 800 of the illustrated example includes a processor 812. The processor 812 of the illustrated example is hardware. For example, the processor 812 can be implemented by one or more integrated circuits, logic circuits, microprocessors or controllers from any desired family or manufacturer. In the illustrated example of FIG. 8, the processor 812 includes one or more example processing cores 815 configured via example instructions 832, which include the example instructions of FIGS. 4, 5, and/or 6, to implement the example compressor 204, the example splitter 206, the example data set distributor 210, the example communication session controller 212, the example input queue monitors 222 2, the example first ID extractor 304, the example chunk distributor 306, the example second ID extractor 316, the example first rate selector 322, the example second rate selector 324, the example value calculator 326, the example comparator 328, the example session initiator/terminator 312, the example chunking tool controller 332, the example chunking tool 334, the example third rate selector 336, the example ID/rate correlator 342, the example chunk size calculator 340, the example chunk generator 344, and/or the example ID adder 346 of FIGS. 2, 3A and 3B.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), and/or a PCI express interface. In the illustrated example of FIG. 8, the interface circuit 820 is also structured to implement the example input queues 216 by which data chunks are supplied to the example communication devices 222 (see FIG. 2).

In the illustrated example, one or more input devices 822 are connected to the interface circuit 820. The input device(s) 822 permit(s) a user to enter data and commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 820 of the illustrated example, thus, typically includes a graphics driver card, a graphics driver chip or a graphics driver processor. In some examples, the input devices 822 and the output devices 824 include the wireless communication devices 214.

The interface circuit 820 of the illustrated example also includes a communication device such as a transmitter, a receiver, a transceiver, a modem and/or network interface card to facilitate exchange of data with external machines (e.g., computing devices of any kind) via a network 826 (e.g., an Ethernet connection, a digital subscriber line (DSL), a telephone line, coaxial cable, a cellular telephone system, etc.).

The processor platform 800 of the illustrated example also includes one or more mass storage devices 828 for storing software and/or data. Examples of such mass storage devices 828 include floppy disk drives, hard drive disks, compact disk drives, Blu-ray disk drives, RAID systems, and digital versatile disk (DVD) drives.

The coded instructions 832 of FIGS. 4, 5, and/or 6 may be stored in the mass storage device 828, in the volatile memory 814, in the non-volatile memory 816, and/or on a removable tangible computer readable storage medium such as a CD or DVD. In some examples, the mass storage device 830 may implement the example intact data set storage 202, the example chunk data storage 208, the example first set of rate storage registers 320, and/or the example second set of rate storage registers 338. Additionally or alternatively, in some examples the volatile memory 814 may implement the example intact data set storage 202, the example chunk data storage 208, the example first set of rate storage registers 320, and/or the example second set of rate storage registers 338 and the non-volatile memory 816 may implement the example intact data set storage 202, the example chunk data storage 208, the example first set of rate storage registers 320, and/or the example second set of rate storage registers 338.

From the foregoing, it will be appreciated that the above disclosed methods, apparatus and articles of manufacture permit the wireless transfer of large quantities of data (video, image, multi-media, etc.) in parallel thereby reducing the total time required to transmit the data between a field station (e.g., the high capacity field data transceiver) and a central data station (e.g., the high capacity cloud data transceiver) from days to hours. In addition to reducing the total data transfer time, the high capacity data transceivers disclosed herein operate to further improve the overall data transfer rate by controlling the initiation and termination of communication sessions based on the data transfer rates achieved by individual (and collective) ones which of the communication sessions. Further, the high capacity data transceivers conserve battery power by selectively terminating ones of the communication sessions that are transferring data at a slower rate than others of the communication sessions. To further conserve battery power, the high capacity data transceivers disclosed herein are capable of terminating (and/or not initiating) additional communication sessions when such additional communication sessions do not appreciably increase a total data transfer rate achieved by the high capacity data transceiver.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A data transfer method comprising:
controlling, by one or more processors, a distribution of portions of a field data set to a network access point, wherein the distribution occurs in parallel via a plurality of communication sessions established by respective ones of a plurality of communication devices with the network access point;
monitoring, by the one or more processors, a plurality of input queues associated with the plurality of communication devices respectively to provide pulses containing information identifying empty input queues;
determining, by the one or more processors, respective data transfer rates of the plurality of communication devices based on the pulses;
comparing, by the one or more processors, a first value based on a respective data transfer rate of a first one of the plurality of communication sessions associated with a first communication device of the plurality of communication devices to a second value based on a respective data transfer rate of a second one of the plurality of communication sessions associated with a second communication device of the plurality of communication devices;
determining, by the one or more processors, to establish a new communication session based on the comparing; and
instructing, by the one or more processors, a third communication device to:
establish the new communication session with the network access point;
provide a first portion of the field data set based on a respective data transfer rate of the new communication session; and
transmit the first portion of the field data set to the network access point using the new communication session.

2. The data transfer method of claim 1, wherein comparing the first value to the second value includes determining whether the second value is higher than the first value by a threshold amount.

3. The data transfer method of claim 2, wherein the second value is a total data transfer rate of multiple ones of the plurality of communication sessions including the respective data transfer rates of the first one and the second one of the plurality of communication sessions.

4. The data transfer method of claim 1, further including:
comparing the first value to the second value to determine whether to terminate the second one of the plurality of communication sessions; and
in response to determining to terminate the second one of the plurality of communication sessions, instructing the second one of the plurality of communication devices to terminate the second one of the plurality of communication sessions.

5. The data transfer method of claim 4, further including:
after terminating the second one of the plurality of communication sessions, instructing the second one of the plurality of communication devices to re-establish a communication session with the network access point to transmit the first portion of the field data set to the network access point.

6. The data transfer method of claim 1, wherein the portions of the field data set are chunks of the field data set, the method further including:
using a data chunking technique to obtain the chunks;
adaptively generating the chunks with chunk sizes based on data transfer rates associated with the respective ones of the plurality of communication devices; and
distributing the chunks to the respective ones of the plurality of communication devices.

7. The data transfer method of claim 1, the method further including:
initiating a first set of the plurality of communication sessions;
initiating a second set of the plurality of communication sessions; and
in response to determining that a first overall data transfer rate achieved using the first set of the plurality of communication sessions and the second set of the plurality of communication sessions is not greater, by a threshold value, than a second overall data transfer rate achieved using the first set of the plurality of communication sessions but not the second set of the plurality of communication sessions, terminating the second set of the plurality of communication sessions.

8. A tangible computer readable storage medium comprising computer readable instructions which, when executed, cause a computer to perform operations comprising:
  transmitting portions of a field data set to a network access point in parallel via a plurality of communication sessions established by respective ones of a plurality of communication devices with the network access point;
  monitoring a plurality of input queues associated with the plurality of communication devices respectively to provide pulses containing information identifying empty input queues;
  determining respective data transfer rates of the plurality of communication devices based on the pulses;
  comparing a first value based on a respective data transfer rate of a first one of the plurality of communication sessions associated with a first communication device of the plurality of communication devices to a second value based on a respective data transfer rate of a second one of the plurality of communication sessions associated with a second communication device of the plurality of communication devices;
  determining to establish a new communication session based on the comparing; and
  instructing a third communication device to:
    establish the new communication session with the network access point;
    provide a first portion of the field data set based on a respective data transfer rate of the new communication session; and
    transmit the first portion of the field data set to the network access point using the new communication session.

9. The tangible computer readable storage medium of claim 8, wherein the second value is equal to the respective data transfer rate of the second one of the plurality of communication sessions.

10. The tangible computer readable storage medium of claim 8, wherein the second value is a total data transfer rate of multiple ones of the plurality of communication sessions including the respective data transfer rates of the first one and the second one of the plurality of communication sessions.

11. The tangible computer readable storage medium of claim 8, the operations further including:
  comparing the first value to the second value to determine whether to terminate the second one of the plurality of communication sessions; and
  in response to determining to terminate the second one of the plurality of communication sessions, instructing the second one of the plurality of communication devices to terminate the second one of the plurality of communication sessions.

12. The tangible computer readable storage medium of claim 11, the operations further including instructing the second one of the plurality of communication devices to re-establish a new communication session with the network access point to transmit the first portion of the field data set to the network access point.

13. The tangible computer readable storage medium of claim 8, wherein the portions of the field data set are chunks of the field data set, the operations further including:
  using a data chunking technique to obtain the chunks;
  adaptively generating the chunks with chunk sizes based on data transfer rates associated with the respective ones of the plurality of communication devices; and
  distributing the chunks to the respective ones of the plurality of communication devices.

14. The tangible computer readable storage medium of claim 8, the operations further including:
  initiating a first set of the plurality of communication sessions;
  initiating a second set of the plurality of communication sessions; and
  in response to determining that a first overall data transfer rate achieved using the first set of the plurality of communication sessions and the second set of the plurality of communication sessions is not greater, by a threshold value, than a second overall data transfer rate achieved using the first set of the plurality of communication sessions but not the second set of the plurality of communication sessions, terminating the second set of the plurality of communication sessions.

15. A transceiver station to transfer data to a network access point, the transceiver station comprising:
  a memory including machine readable instructions; and
  a processor to execute the machine readable instructions to perform operations comprising:
    controlling transmission of portions of a field data set to the network access point in parallel via a plurality of communication sessions established by respective ones of a plurality of communication devices with the network access point;
    monitoring a plurality of input queues associated with the plurality of communication devices respectively to provide pulses containing information identifying empty input queues;
    determining respective data transfer rates of the plurality of communication devices based on the pulses;
    comparing a first value based on a respective data transfer rate of a first one of the plurality of communication sessions associated with a first communication device of the plurality of communication devices to a second value based on a respective data transfer rate of a second one of the plurality of communication sessions associated with a second communication device of the plurality of communication devices;
    determining to establish a new communication session with a third communication device of the plurality of communication devices based on the comparing; and
    instructing the third communication device to:
      establish the new communication session with the network access point;
      provide a first portion of the field data set based on a respective data transfer rate of the new communication session; and
      transmit the first portion of the field data set to the network access point using the new communication session.

16. The transceiver station of claim 15, wherein the second value is equal to the respective data transfer rate of the second one of the plurality of communication sessions.

17. The transceiver station of claim 15, wherein the second value is a total data transfer rate of multiple ones of the plurality of communication sessions including the respective data transfer rates of the first one and the second one of the plurality of communication sessions.

18. The transceiver station of claim 15, the operations further including:

comparing the first value to the second value to determine whether to terminate the second one of the plurality of communication sessions; and in response to determining to terminate the second one of the plurality of communication sessions, instructing the second one of the plurality of communication devices to terminate the second one of the plurality of communication sessions.

19. The transceiver station of claim 18, the operations further including instructing the second one of the plurality of communication devices to re-establish a new communication session with the network access point to transmit the respective portion of the field data set to the network access point.

20. The transceiver station of claim 19, wherein the portions of the field data set are chunks of the field data set, the operations further including:

using a chunking technique to obtain the chunks of the field data set; and distributing the chunks to the respective ones of the plurality of communication devices.

* * * * *